United States Patent [19]
Jansen et al.

[11] Patent Number: 5,392,436
[45] Date of Patent: Feb. 21, 1995

[54] TWO LEVEL SYSTEM BUS ARBITRATION HAVING LOWER PRIORITY MULTIPROCESSOR ARBITRATION AND HIGHER PRIORITY IN A SINGLE PROCESSOR AND A PLURALITY OF BUS MASTERS ARBITRATION

[75] Inventors: Kenneth A. Jansen; Montgomery C. McGraw, both of Spring; David A. Miller, Houston; Paul R. Culley, Cypress, all of Tex.

[73] Assignee: Compaq Computer Corporation, Houston, Tex.

[21] Appl. No.: 249,665

[22] Filed: May 26, 1994

Related U.S. Application Data

[63] Continuation of Ser. No. 993,958, Dec. 18, 1992, abandoned, which is a continuation of Ser. No. 431,746, Nov. 3, 1989, abandoned.

[51] Int. Cl.⁶ .................... G06F 13/36; G06F 13/18
[52] U.S. Cl. .................... 395/725; 370/85.2; 370/85.6; 364/242.9; 364/242.92; 364/241.5
[58] Field of Search ............ 395/325, 725, 800; 370/85.2, 85.6; 340/825.5

[56] References Cited

U.S. PATENT DOCUMENTS

| | | |
|---|---|---|
| 4,151,592 | 4/1979 | Suzuki et al. . |
| 4,257,095 | 3/1981 | Nadir . |
| 4,320,457 | 3/1982 | Tanikawa . |
| 4,375,639 | 3/1983 | Johnson, Jr. . |
| 4,402,040 | 8/1983 | Evett . |
| 4,488,218 | 12/1984 | Grimes . |
| 4,494,192 | 1/1985 | Lew et al. . |
| 4,571,672 | 2/1986 | Hatada et al. . |
| 4,602,327 | 7/1986 | LaViolette et al. . |
| 4,611,276 | 9/1986 | Vinot . |
| 4,620,278 | 10/1986 | Ellsworth et al. . |
| 4,639,859 | 1/1987 | Ott . |
| 4,745,548 | 5/1988 | Blahut . |
| 4,755,938 | 7/1988 | Takahashi et al. . |
| 4,791,563 | 12/1988 | Kling . |
| 4,837,682 | 6/1989 | Culler . |
| 4,987,529 | 1/1991 | Craft et al. . |

FOREIGN PATENT DOCUMENTS

| | | |
|---|---|---|
| 0291907 | 11/1988 | European Pat. Off. . |
| 56-146862 | 9/1981 | Japan . |
| 2138183 | 10/1984 | United Kingdom . |

OTHER PUBLICATIONS

Intel Corp., Peripherals, 1990, pp. 1-207 to 1-290.
Intel Corp., Microprocessor and Peripheral Handbook, 1989, vol. 1, pp. 4-1 to 4-132.
Intel Corp., Microprocessor and Peripherals Handbook, 1989, vol. 1, pp. 4-292 to 4-353.
Compaq Computer Corp., Compaq Deskpro 386 Technical Reference Guide, May, 1987, pp. 2-36.
Compaq Computer Corp., Compaq Deskpro 386/25 Technical Reference Guide, Aug., 1988, pp. 2-44.

*Primary Examiner*—Parshotam S. Lall
*Assistant Examiner*—Krisna Lim
*Attorney, Agent, or Firm*—Pravel, Hewitt, Kimball & Krieger

[57] ABSTRACT

A method and apparatus for arbitrating between multiple processors that can be incorporated into an arbitration scheme that is designed to include only a single processor. The method includes consolidating the individual bus requests of each processor into a single bus request supplied to the single processor arbitration scheme. When control of the bus is allocated to the single processor, the multiprocessor arbitration arbitrates among the processors who requested the bus. The bus protocol used includes a least recently used method for granting bus access to the multiple processors coupled with a means for giving one processor priority over the others for access to the bus. The protocol also includes protection from interruption for the respective processor in control of the bus for a preset period of time.

10 Claims, 12 Drawing Sheets

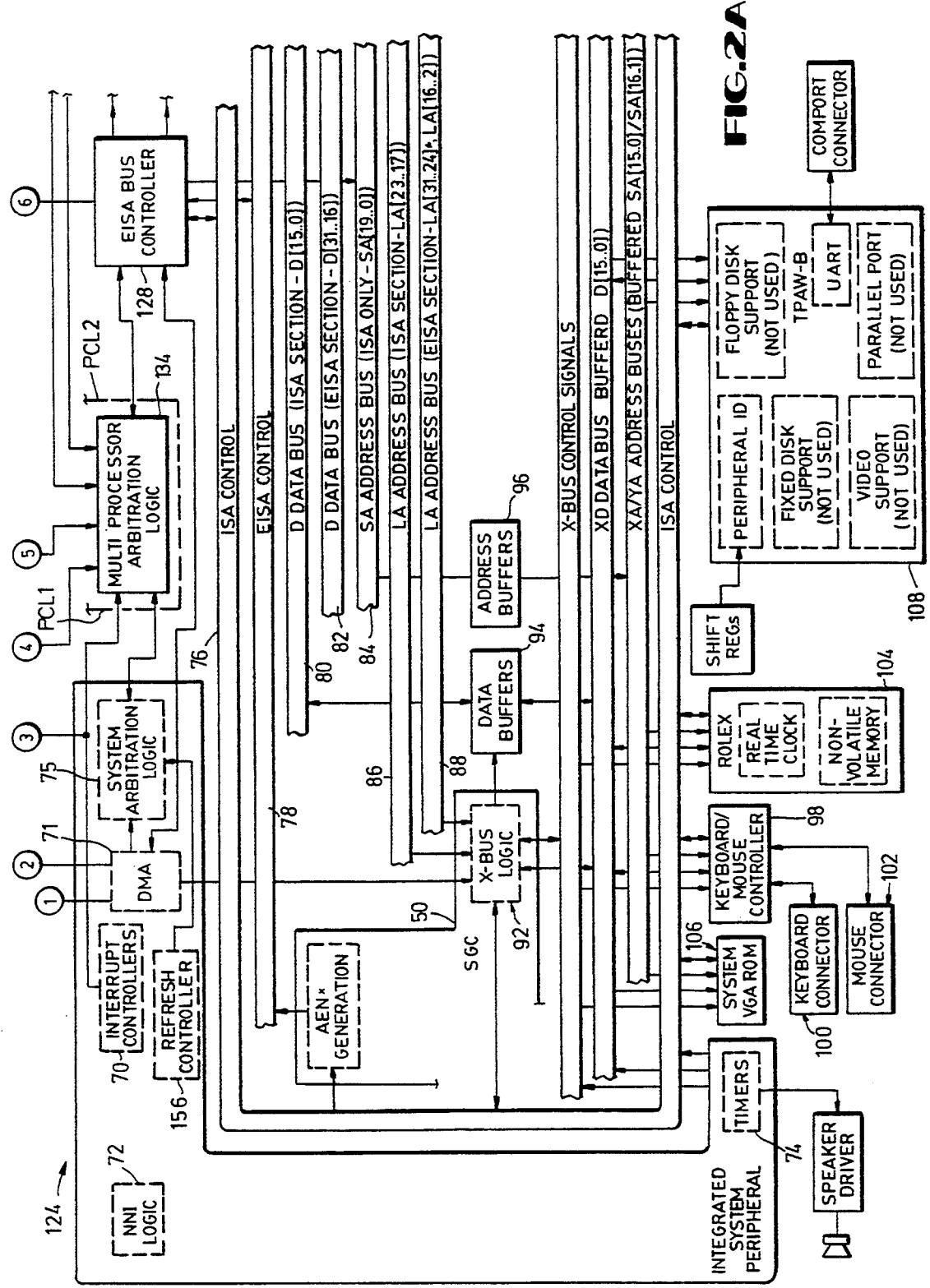

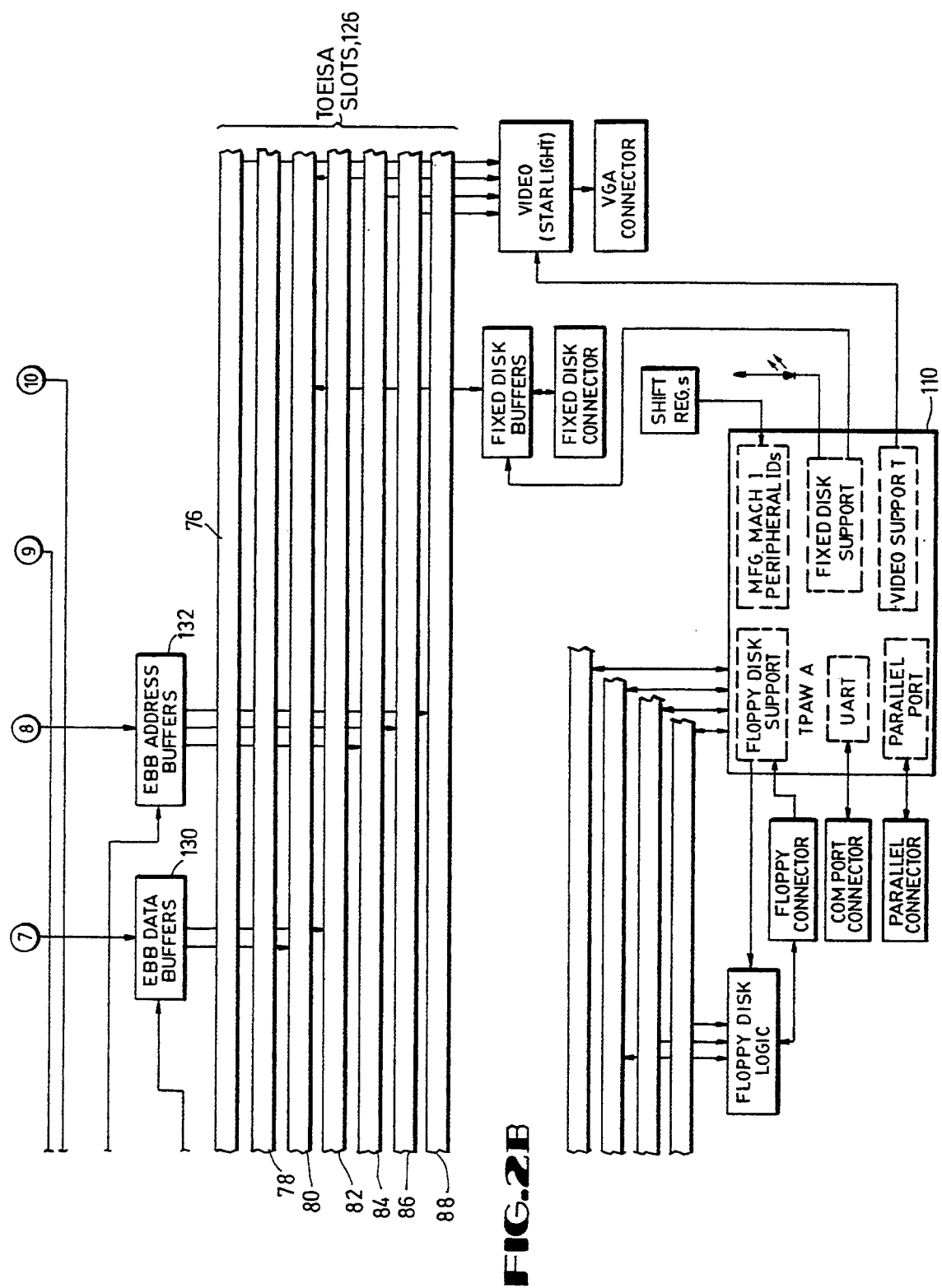

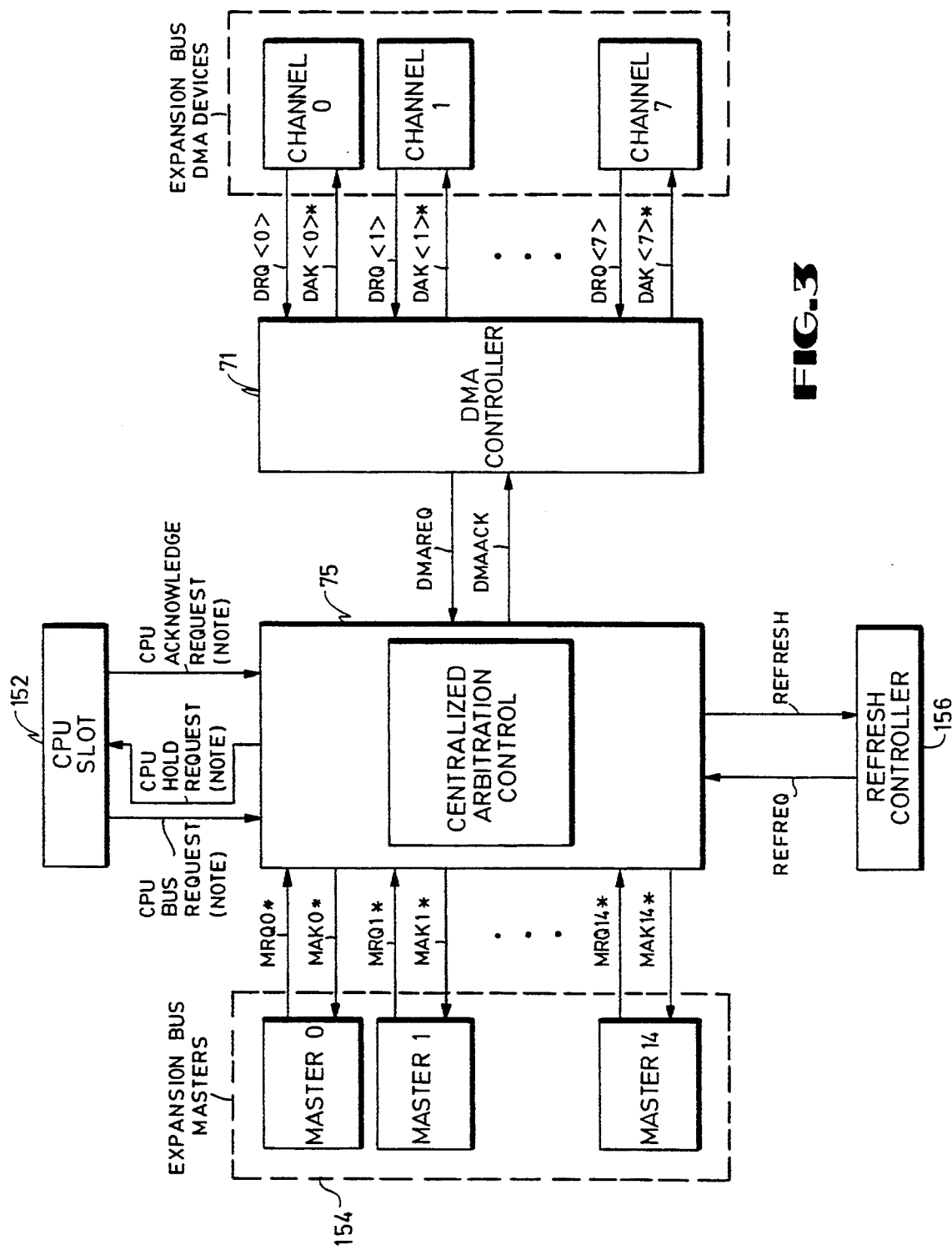

TWO LEVEL SYSTEM BUS ARBITRATION HAVING LOWER PRIORITY MULTIPROCESSOR ARBITRATION AND HIGHER PRIORITY IN A SINGLE PROCESSOR AND A PLURALITY OF BUS MASTERS ARBITRATION

This is a continuation of application Ser. No. 07/993,958, filed on Dec. 18, 1992, now abandoned, which is a continuation of application Ser. No. 07/431,746, filed on Nov. 03, 1989, now abandoned.

BACKGROUND OF THE INVENTION

1. Field of the Invention

The present invention relates to multiple processors in computer systems, and more particularly to bus arbitration between multiple processors in computer systems with single processor arbitration schemes.

2. Description of the Prior Art

The personal computer industry is a vibrant and growing field that continues to evolve as new innovations occur. The driving force behind this innovation has been the increasing demand for faster and more powerful personal computers. In order to meet this demand, computer designers have used various methods to increase the speed with which personal computers can process instructions.

Historically the personal computer has developed as a system incorporating a single microprocessor to handle all instruction execution. The microprocessor is the key working unit or "brains" of the personal computer, and its task is to handle all of the instructions that programs give it in the form of computer software. One method that is being used to increase the speed of the personal computer system is the incorporation of multiple microprocessors operating in parallel into a computer system. With the use of multiple processors, or multiprocessing, each microprocessor can be working on a different task at the same time. Systems that incorporate multiprocessing generally use standard microprocessors that operate off of a common bus and share a common memory. Due to the large amount of existing single processor-based computer systems, it would be desirable to be able to incorporate multiple processors into these single processor systems with minimal changes to the system.

One of the most important considerations in the design of a computer system involves the communication of data and synchronization/control signals between all of the various components which comprise it. In personal computer systems compatible with those previously manufactured and sold by International Business Machines Corp. (IBM), communication between the various components which comprise the computer is accomplished via a "shared bus" architecture, wherein the functional units of the system are connected by a common collection of conductive lines called a bus. In such an organization, only one module at a time can exert control over the use of the shared bus, and contention among the units which require the use of the bus must be resolved in some manner. This problem of resolving bus contention between the various units which require the bus is generally known as arbitration. The problem of bus arbitration is even more pronounced in a multiprocessing environment due to the effect of additional microprocessors vying for control of the bus.

Personal computers that have been developed to incorporate a single microprocessor have generally included an arbitration scheme that assumes only a single processor will be present within the system. Therefore, if an incorporation of multiple microprocessors into a single processor-based computer system is desired, it is necessary that the fact that multiple processors exist within the system be invisible to the system's arbitration scheme.

Background on the single processor-based arbitration scheme in which the present invention is incorporated is deemed appropriate. In 1981 IBM introduced the personal computer, the IBM PC, which was based on the Intel Corporation (Intel) 8088 microprocessor. The bus architecture used in the original IBM PC and the PC/AT has generally become known as the Industry Standard Architecture (ISA). Computer systems developed according to the ISA had a priority scheme wherein the processor had control of the bus, except when the direct memory access controller requested and received control or when a memory refresh cycle was occurring.

Many improvements and extensions have been made on the ISA, the latest development being an extended version of the ISA referred to as the Extended Industry Standard Architecture (EISA) that includes a 32-bit data bus, a 32-bit address bus and full backwards compatibility with ISA devices and software. In conjunction with the development of EISA, Intel Corporation, a major manufacturer of computer components and devices for IBM-compatible personal computers, developed a device referred to as the Integrated System Peripheral (ISP) that is designed to be used in an EISA system. The ISP integrates many of the EISA required functions into a single device, including a 7 channel, 32-bit DMA controller, an interrupt controller module, a timer/counter module, a refresh address generator, and a system arbiter, among others. The arbitration scheme that the ISP includes is intended for a single processor-based system and includes several levels of priority with each level incorporating a rotating priority scheme. The system arbiter in the ISP generally conducts arbitration for control of the bus between four devices, these being the direct memory access (DMA) system, the memory refresh system, the various bus masters, and a single CPU.

SUMMARY

The present invention includes an arbitration scheme for arbitrating between multiple processors that can be incorporated into a system with an arbitration scheme that is designed to include only a single processor. The present invention therefore allows multiple processors to be incorporated into a single-processor based system with minimal changes to the system. The multiprocessor arbiter is interfaced between the microprocessors and the system arbiter and receives the various bus requests from each of the processors. It then arbitrates among these requests for the lone CPU arbitration slot offered by the system arbiter.

The multiprocesor arbitration scheme according to the present invention includes a rotating priority scheme whereby the processor that was least recently on the bus is generally given access. However, a single primary processor may be given priority of control of the bus over the remaining secondary processors through the assertion of a priority signal. Generally, if one CPU requires the bus and the other CPU has control of the bus and the system arbiter is not requesting the bus, then the multiprocesor arbiter requests that the other CPU get off the bus by asserting the other CPU's HOLD line. When this other CPU acknowledges the HOLD request by asserting its HLDA or hold acknowledge signal, the multiprocesor arbiter grants control to the requesting CPU by deasserting its HOLD line. If one CPU requests the bus and another device such as a bus master, the direct memory access (DMA) system, or the refresh controller has control of the bus, then the system arbiter is informed that a CPU bus cycle request is pending and that it should include the CPU as a contender in the next bus arbitration. If multiple CPU's are requesting control of the bus and the primary CPU is not asserting its priority over the secondary CPUs, then the one that was least recently on the bus is granted control. If multiple CPU's are requesting the bus and the primary CPU is asserting its priority, then the primary CPU is granted control of the bus.

When one of the CPUs gains control of the bus, control is generally maintained until requested by the other CPU or the system arbiter. However, control of the bus by the respective CPU is protected from interruption for a certain length of time by a timer that inhibits arbitration during the time it is counting down. When control is transferred to one of the CPU's, the timer is started and prevents interruption for a period determined by a predetermined value stored in a register. As long as the timer is active and the respective CPU's bus request remains active, the CPU will not be interrupted by the system arbiter or any other CPU's bus request. However, a secondary processor can still be interrupted by the primary processor if the primary processor is asserting its priority.

BRIEF DESCRIPTION OF THE DRAWINGS

A better understanding of the present invention can be obtained when the following detailed description of the preferred embodiment is considered in conjunction with the following drawings, in which:

FIGS. 1A, 1, 2A and 2B are schematic block diagrams of a computer system incorporating the present invention;

FIG. 3 is a schematic block diagram of the system arbitration logic of FIG. 2 interfaced to the various devices which may request control of the bus;

DESCRIPTION OF THE PREFERRED EMBODIMENT

The design according to the present invention includes an arbitration scheme for arbitrating between multiple processors that can be incorporated into a system arbitration scheme that was originally designed to include only a single processor. The following description will be discussed with reference to the system arbitration scheme incorporated in the integrated system peripheral developed by Intel, but the incorporation of this design into other system arbitration schemes is also contemplated.

Figure 1A:
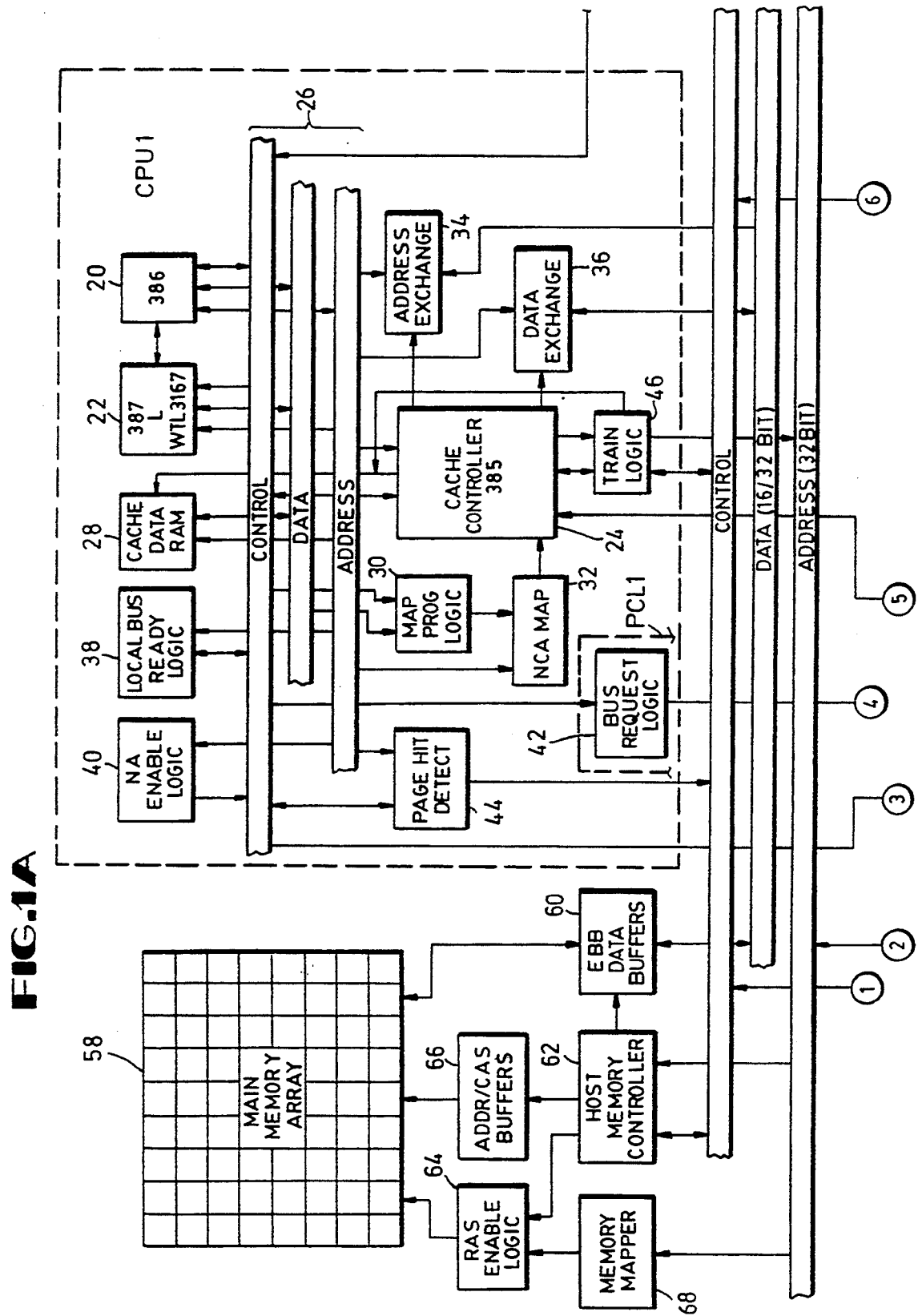
Figure 1B:
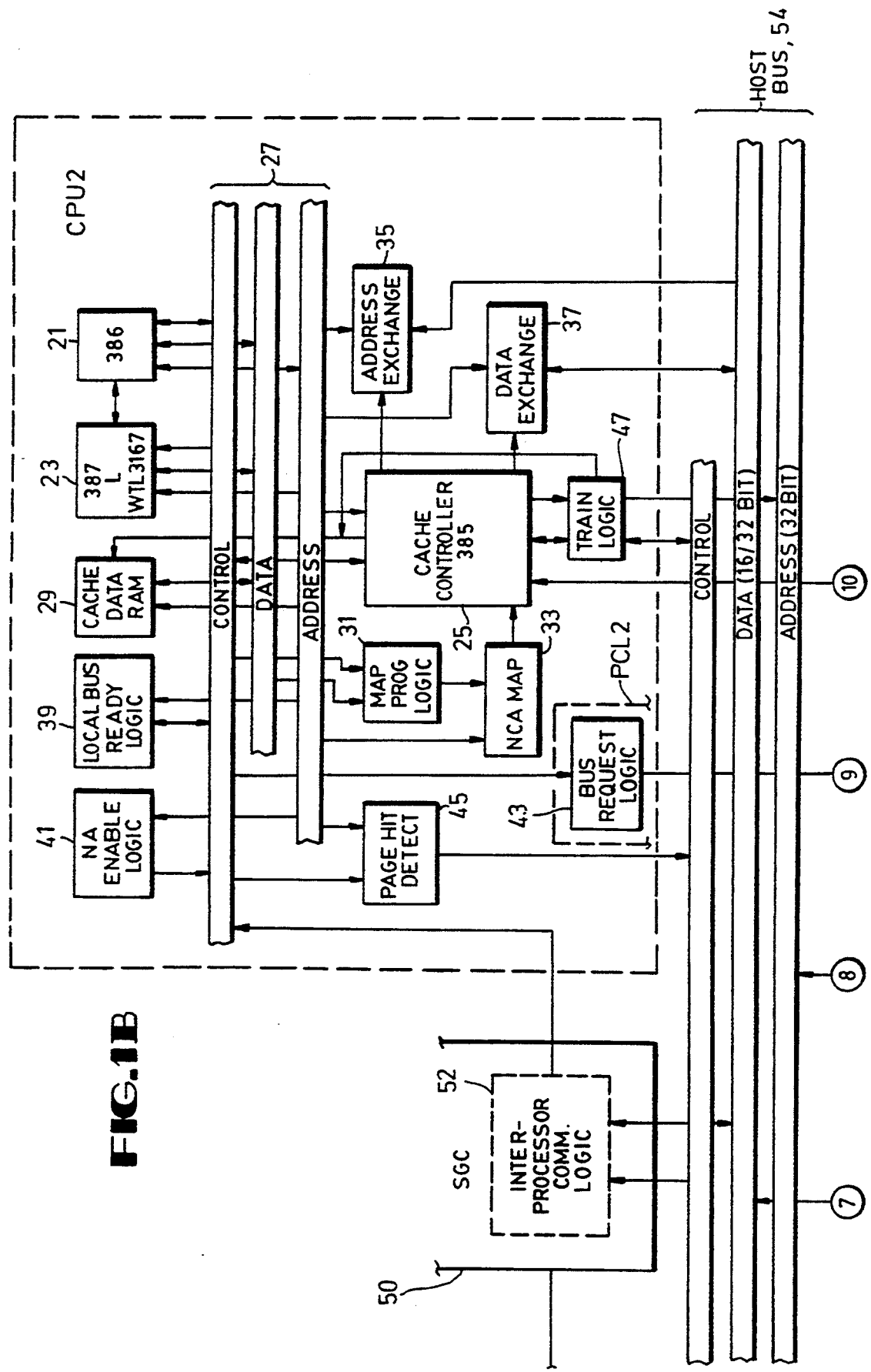

Referring now to FIGS. 1 and 2, the letter C designates generally a computer system incorporating the present invention. For clarity, system C is shown in two portions, with the interconnections between FIGS. 1 and 2 designated by reference to the circled numbers one to eight. System C is comprised of a number of block elements interconnected via four buses. The details of the portion of the system illustrated in FIGS. 1 and 2, and not discussed in detail below are not significant to the present invention other than to illustrate an example of a fully configured computer system. Throughout this specification, signal mnemonics with an asterisk following the signal descriptors indicates the signal is active at a logic low level. Signal mnemonics having numbers or ranges between angled brackets refer to those particular bits or positions in a bus.

In FIG. 1, a computer system is depicted. The computer system C generally includes a primary central processing unit referred to as CPU1, and a secondary central processing unit referred to as CPU2. The central processing units, CPU1 and CPU2, are similar in content and will be discussed together for the sake of clarity. CPU1 and CPU2 each comprise a processor 20 and 21, a numerical coprocessor 22 and 23, and a cache memory controller 24 and 25, respectively as well as associated logic circuits connected to a local processor bus 26 and 27, respectively. Associated with each cache controller 24 and 25 is high speed cache data random access memory (RAM) 28 and 29, noncacheable memory address (NCA) map programming logic circuitry 30 and 31, noncacheable address or NCA map 32 and 33, address exchange latch circuitry 34 and 35, page hit detect logic circuitry 44 and 45, train logic circuitry 46 and 47 used to develop a 64 kbyte cache memory and data exchange transceiver 36 and 37, respectively. Associated with CPU1 and CPU2 also are a local bus ready logic circuitry 38 and 39, and next address (NA) enable logic circuitry 40 and 41, respectively. CPU1 and CPU2 each include various processor control logic circuitry, referred to as PCL1 and PCL2, respectively, that includes bus request logic circuitry 42 and 43, respectively, as well as multiprocesor arbitration logic 134 (FIG. 2) according to the present invention. The multiprocesor arbitration logic 134 includes the multiprocesor arbiter and a timer referred to as the EISA arbitration inhibit (EAI) timer that prevents host bus 54 arbitration for a set period of time.

Each processor 20 and 21 is preferably an Intel 80386 microprocessor. Alternatively, an Intel 80486 processor can be used, preferably with external cache memory and an external cache controller. Each processor 20 and 21 has its control, address and data lines interfaced to its local processor bus 26 and 27, respectively. The coprocessor 22 and 23 is preferably an Intel 80387 and/or Weitek WTL 3167 numeric coprocessor interfacing with the respective local processor bus 26 and 27 and the processor 20 and 21 in the conventional manner. Each cache RAM 28 and 29 is preferably suitable high-speed static random access memory which interfaces with the address and data elements of the respective bus 26 and 27 under control of the respective cache controller 24 and 25 to carry out required cache memory operations. Each cache controller 24 and 25 is preferably an Intel 82385 cache controller configured to operate in two-way set associative master mode. In the preferred embodiment the components are the 33 MHz versions of the respective units. Address latch circuitry 34 and 35 and data transceiver 36 and 37 interface the respective cache controller 24 and 25 with the processor 20 and 22 and provide a local bus interface between the local processor bus 26 and 27 and a host bus 54.

Interfaced between the control bus of each of the local processor buses 26 and 27 is a block circuit 52 generally containing inter-processor communication logic. This block circuit 52 is generally included in a chip referred to as the system glue chip (SGC) 50.

The main memory array 58 is preferably dynamic random access memory. Memory 58 interfaces with the host bus 54 via a data buffer circuit referred to as EISA bus buffer (EBB) 60, a memory controller circuit 62 and a memory mapper 68. The buffer 60 performs data transceiving and parity generating and checking functions. The memory controller 62 and the memory mapper 68 interface with the memory 58 via address and column address strobe (ADDR/CAS) buffers 66 and row address strobe (RAS) enable logic circuit 64.

In the drawings, system C is configured having the processor bus 26, the host bus 54, an extended industry standard architecture (EISA) bus 126 (FIG. 2) and an X bus 90. The portion of system C illustrated in FIG. 2 is essentially a configured EISA system which includes the necessary EISA bus 126, an EISA bus controller 128, data latches and transceivers 130 and address latches and buffers 132 to interface between the EISA bus 126 and the host bus 54. The EISA specification Version 3.1 is provided in U.S. Pat. No. 5,101,492 filed Sep. 3, 1989, issued Mar. 31, 1992, and entitled "Data Redundancy and Recovery Protection" by Schultz, et al., and fully explains the requirements of an EISA system and is hereby incorporated by reference. Also illustrated in FIG. 12 is the integrated system peripheral 124 which incorporates a number of the elements used in an EISA-based computer system.

The integrated system peripheral (ISP) 124 includes a direct memory access controller 71 for controlling access to main memory 58 (FIG. 1) or memory contained in EISA slots and input/output (I/O) locations without the need for direct control by either processor 20 and 21. The ISP 124 includes a refresh controller 156, interrupt controllers 70, nonmaskable interrupt logic 72 and system timers 74 which allow control of interrupt signals and generate necessary timing signals and wait states in a manner according to the EISA specification and conventional practice.

The ISP 124 also includes system arbitration logic 75 which arbitrates among the various requests for control of the EISA bus 126. The multiprocesor arbitration logic 134 is interfaced between the system arbitration logic 75, and the respective cache controller 24 and 25 of CPU1 and CPU2, as well as to the respective bus request logic and 43 and the bus controller 128. The multiprocesor arbitration logic 134 works in conjunction with the system arbitration logic 75 to coordinate the various requests for the bus by CPU1 and CPU2 via its respective cache controller 24 and 25 and arbitrates among these requests for the 1one CPU arbitration slot 152 (FIG. 3) offered by the system arbitration logic 75.

The EISA bus 126 includes ISA and EISA control buses 76 and 78, ISA and EISA data buses 80 and 82 and address buses 84, 86 and 88. System peripherals are interfaced via the X bus 90 in combination with the ISA control bus 76 from the EISA bus 126. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations and a block circuit 104 which includes a real time clock and CMOS nonvolatile. A serial communications port 108 is also connected to the system C via the X bus 90. Floppy and fixed disk support, a parallel port, a second serial port, and video support circuits are provided in block circuit 110.

Figure 4:
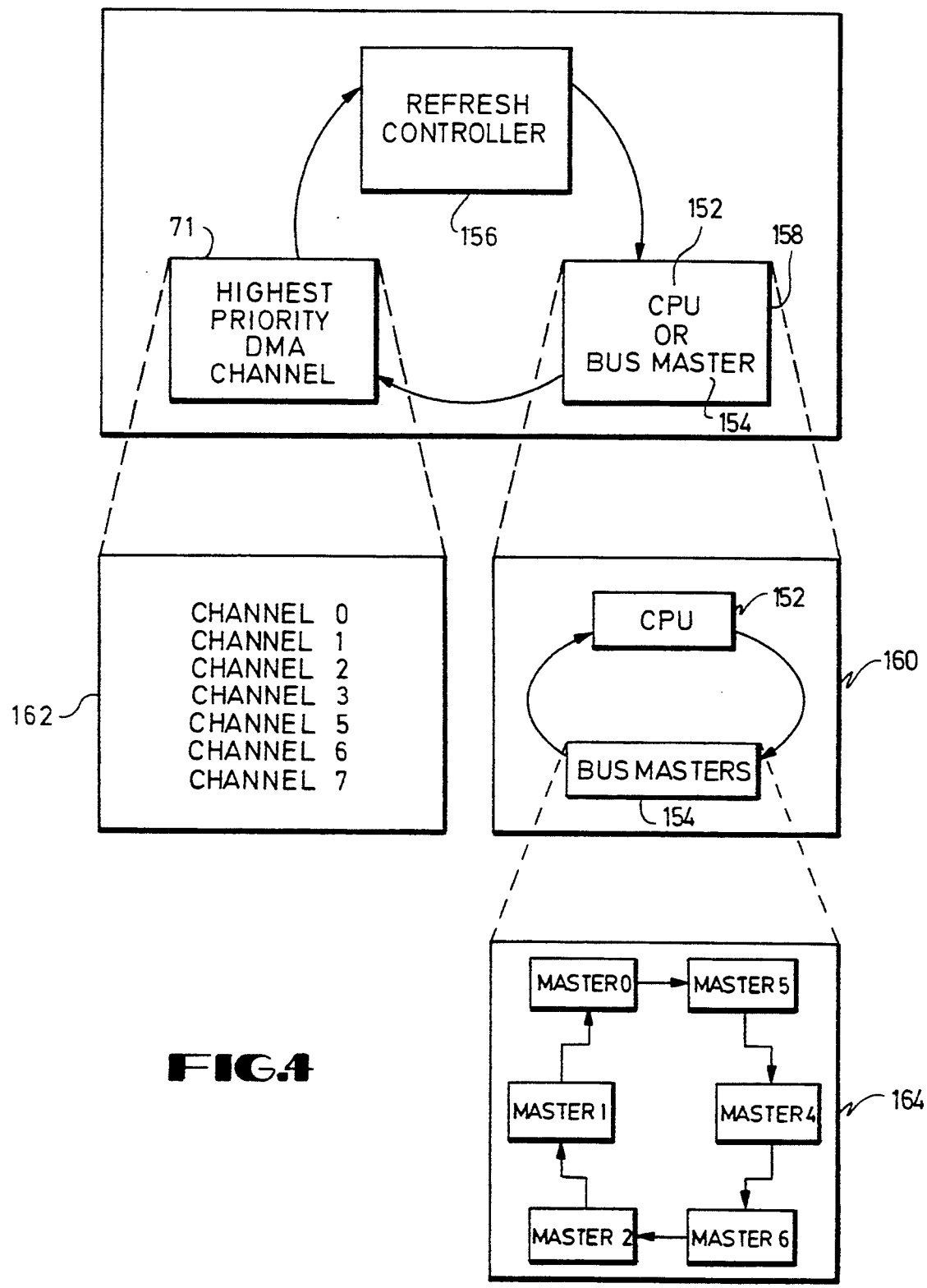
FIG. 4 is a diagram of the priority assignments of the system arbitration logic of FIG. 3.

Referring now to FIG. 3, the ISP 124 includes the arbitration logic 75 for a single processor-based system. The ISP 124 arbitrates between a single CPU 152, up to 15 independent bus masters 154, the refresh controller 156, and the DMA controller 71, which may include up to seven channels. Referring now to FIG. 4, the system arbitration priority schedule included in the ISP 124 is split up into several levels. At each level the devices which are considered equal are given a rotating priority. At each device transition on a given level, all of the devices at higher levels are given a chance to take control of the host bus 54. The first level includes coequal priority requestors that rotate in priority assignment for control of the bus, these being the DMA system 71, the refresh system 156, and a requestor 158 that performs a two-way rotation 160 between a single CPU 152 and the various bus masters 154. The position for the DMA system 71 includes the seven DMA channels 162 available, which have a priority among themselves which is selectable according to the existing ISA. The possible bus masters 164 undergo a rotation for priority in the single master's slot 154 in the CPU/bus master 2-way rotation 160. A six-way rotation of the bus masters 164 is shown for simplicity, but a fifteen-way rotation is preferred.

In this scheme, the DMA controller 71 is given a high level of priority to allow older DMA type devices (such as floppy disk controllers) the short bus latencies they need to remain compatible. Since the refresh logic 156 requires the bus at a regular rate but uses it for short periods, its arbitration rotates with the DMA subsystem 71 and other devices. The CPU 152 is given the next highest priority because it is presumably the basic controller of the system and when it needs the bus for cache misses, it is likely to use the bus for only a short time. Bus masters 154 are set equally low because the design of these devices can take into account the longer latency that is possible for them.

The system arbiter 75 in the ISP 124 performs the function of arbitrating for the EISA bus 126, which requires access to the host bus 54 during DMA and EISA bus master cycles. When the multiprocesor arbiter 134 according to the present invention is included in the computer system C as shown in FIG. 2, multiple CPUs may request control of the bus and vie for the single CPU slot 152 offered by the system arbiter 75. When the EISA bus 126 requires access to the host bus 54, the ISP 124 requests access to the host bus 54 by causing a host bus hold signal called HHOLD to be asserted. When the HHOLD signal is asserted, host bus arbitration begins. If it is determined that the CPU currently in control of the host bus 54 no longer requires the bus or is no longer entitled to the bus because the EAI timer is not active, then the multiprocesor arbiter 134 requests that the respective CPU get off the bus by asserting its HOLD line. When the CPU responds by asserting its hold acknowledge (HLDA) line, the multiprocesor arbiter 134 asserts the host bus hold acknowledge line HHLDA to the ISP 124 and the bus controller 128, and the EISA requester gains control of the host bus 54. This control is generally maintained until the HHOLD signal is deasserted. In the preferred embodiment, the processor control logic circuitry (PCL), PCL1 and PCL2 of CPU1 and CPU2, respectively, each include identical multiprocesor arbitration circuitry 134 according to the present invention. Each PCL includes two possible modes of operation. In one mode, referred to as P1 mode, the PCL implements the logic necessary to support a primary processor as well as the multiprocessor arbitration logic 134 required to arbitrate between two processors. In the other mode, referred to as P2 mode, the PCL performs only the functions necessary to support a secondary processor, In the preferred embodiment, PCL1 is set in P1 mode and PCL2 is set in P2 mode. This mode capability allows a reduced number of circuits to be developed to reduce computer system overall costs.

Figure 5:
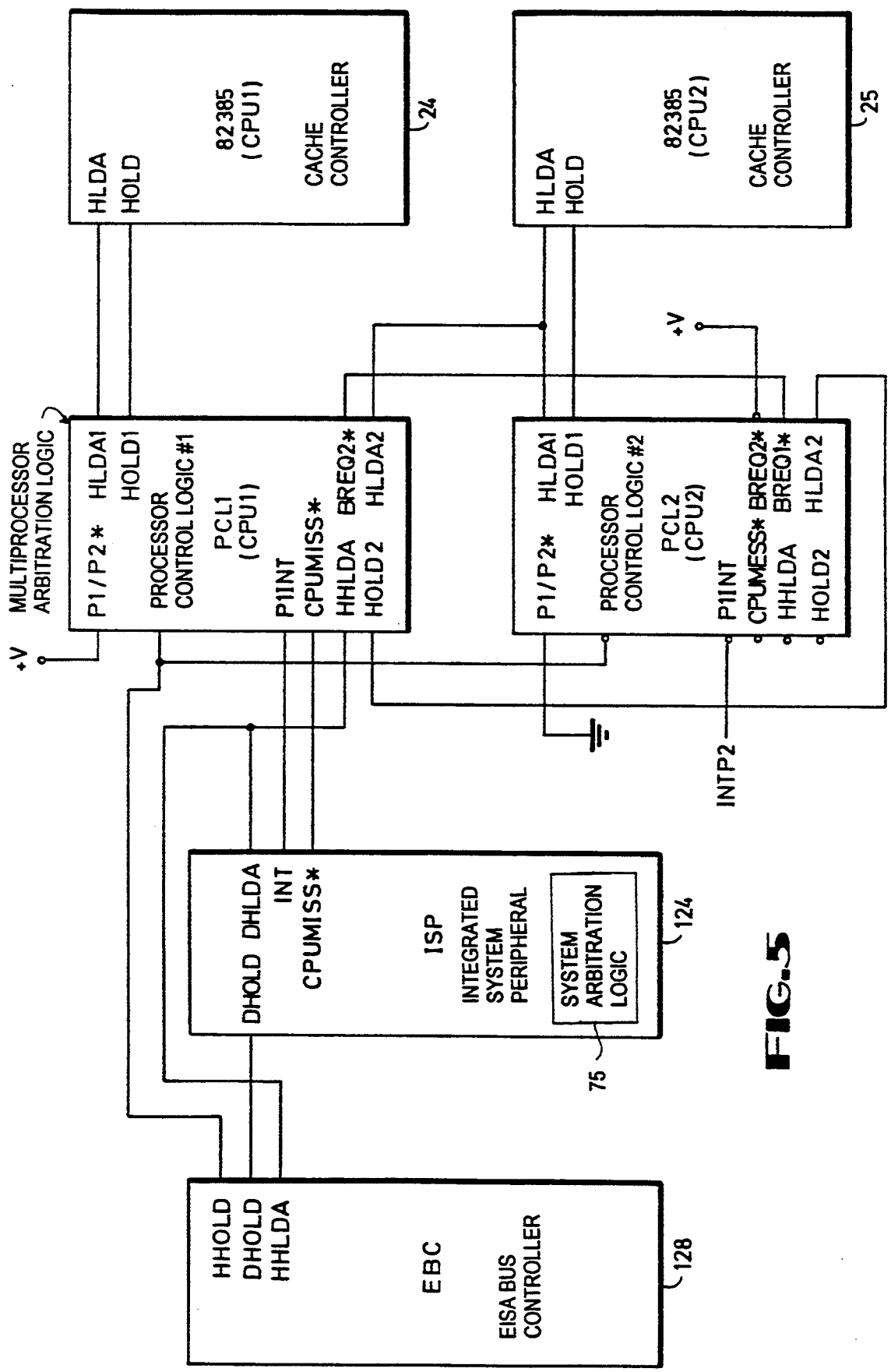
FIG. 5 is a more detailed schematic block diagram of the microprocessor arbitration logic of FIG. 2 according to the present inventions.

Referring now to FIG. 5, PCL1 includes the arbitration logic 134 that allows multiple processors to arbitrate for control of the host bus 54, and it coordinates the arbitration for both CPU1 and CPU2. The arbitration logic 134 in PCL2 mainly serves as an interface between the cache controller 25 of CPU2 and the multiprocesor arbiter 134 in PCL1.

PCL1 and PCL2 are each interfaced to their respective cache controller 24 and 25 of CPU1 and CPU2, respectively, and each includes the respective bus request logic 42 and 43, that asserts a bus request signal when a cache miss cycle is detected. The bus request logic 42 and 43 each internally generate a signal called BREQ1* that indicates, when asserted, that a cache miss has occurred and that the respective CPU has requested access to the host bus 54. On PCL2 the BREQ1* output is connected to an input of PCL1 referred to as the BREQ2* input. Therefore, bus requests by the cache controller 25 of CPU2 are provided to the multiprocessor arbiter 134 in PCL1. The BREQ2* input of PCL2 is tied to a logic high level to internally reflect a high condition. PCL1 uses its own BREQ1* signal and the BREQ2* signal input from PCL2 to generate a single processor host bus request signal referred to as CPUMISS*. The CPU host bus request signal CPUMISS* is connected to the CPUMISS* input of the system arbiter 75 in the ISP 124 and informs it that one of the host CPU's is requesting access to the host bus 54. The CPUMISS* output is a no-connect on PCL2.

PCL1 uses certain control signals to interface between the bus controller 128, the ISP 124 and its respective cache controller 24 as well as the cache controller 25 of CPU2 via PCL2 interface. The hold acknowledge (HLDA) signal output of each of the cache controllers 24 and 25, respectively, is an input to the HLDA1 input of PCL1 and PCL2, respectively. The HLDA output of the cache controller 25 is also connected to an input referred to as the HLDA2 input of PCL1. The respective HLDA signals from each of CPU1 and CPU2 that are input to the multiprocessor arbitration logic 134 in PCL1 are used to indicate bus ownership. On PCL2, the HLDA2 input is connected to the secondary processor hold request signal (HOLD2) output from PCL1. The HOLD2 signal from PCL1 is a hold request which is intended for the cache controller 25 of CPU2. However, the HOLD2 signal is intercepted by the HLDA2 input of PCL2 in order to implement certain lock functions of CPU2, the details of which are not important for current purposes. The HOLD2 signal is a no-connect on PCL2. On PCL1, the processor hold request signal HOLD1 is connected to the HOLD input of the cache controller 24 of CPU1. On PCL2, the HOLD1 signal is connected to the HOLD input of the cache controller 25 of CPU2. On PCL2, the HOLD1 signal acts in place of the HOLD2 signal output from PCL1 which was intended for the cache controller 25 of CPU2 but was intercepted by PCL2. The HOLD1 signal on PCL2 is asserted when the HOLD2 input signal from PCL1 is asserted, thereby enabling PCL1 to control the hold status of cache controller 25 of CPU2.

Each PCL has an input referred to as P1/P2*. When this input is connected to a high logic level, as in the case of PCL1, this indicates that the PCL is in P1 mode. When the P1/P2* input is connected to ground, as in the case of PCL2, this indicates that the PCL is in P2 mode.

The ISP 124 includes an interrupt signal called INT which is driven by the ISP's interrupt controller subsystem 70 to signal to the CPU that an interrupt needs service. The INT signal is connected to the P1 interrupt input (P1INT) of PCL1 and is used by the multiprocessor arbiter 134 in PCL1 to give bus requests of CPU1 a higher priority. If CPU1 requests the bus and the P1INT signal is asserted, then CPU1 is given priority for control of the bus over CPU2 regardless of which had the bus last. The P1INT input on PCL2 is connected to the INTP2 signal, which can be driven by CPU1 through an input/output register to trigger an interupt of CPU2.

The ISP 124 includes a host hold request signal called DHOLD that is connected to the DHOLD input of the bus controller 128. The DHOLD signal is used by the ISP to request control of the host bus 54. When the ISP 124 asserts the DHOLD signal, the bus controller 128 asserts the HHOLD signal, which is connected to the HHOLD inputs of PCL1 and PCL2. The host hold acknowledge signal HHLDA is output from PCL1 and is connected to an input referred to as DHLDA of the ISP 124. The HHLDA output signal from PCL1 is also connected to the HHLDA input of the bus controller 128. The HHLDA signal indicates to the ISP 124 and the bus controller 128 that both CPU1 and CPU2 are on hold and the host bus 54 is available for use by the requestor identified by the system srbiter 75. The HHLDA signal is a no-connect on PCL2.

Therefore, when the system arbiter 75 requests the host bus 54, it asserts the DHOLD signal to the bus controller 128, causing the bus controller 128 to assert the HHOLD signal to PCL1 and PCL2. When the respective CPU relinquishes control of the host bus 54, PCL1 asserts the HHLDA signal to the ISP 124 and the bus controller 128, indicating to the system arbiter 75 that the EISA requestor may have control of the host bus 54.

Figure 6:
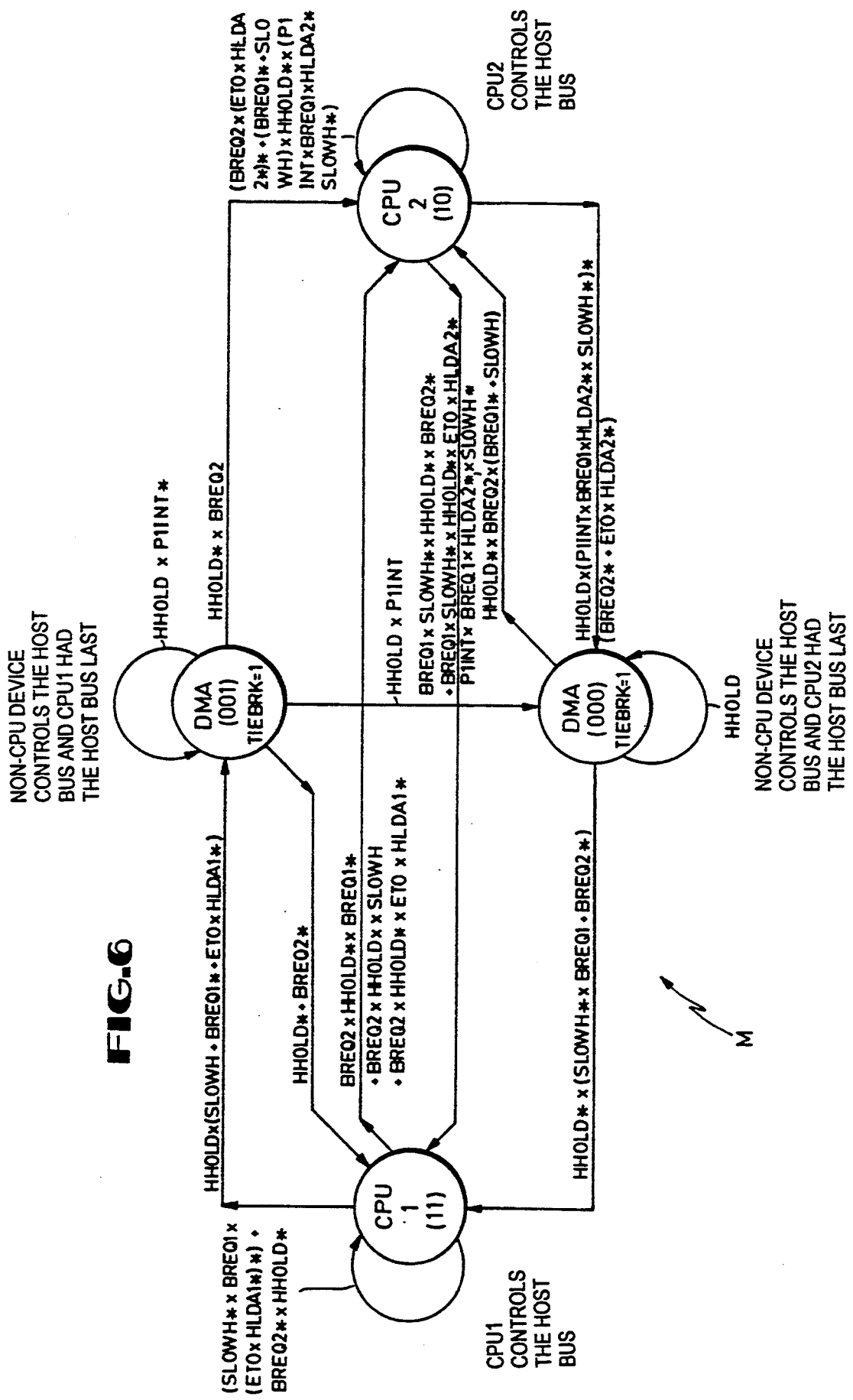
FIG. 6 is a diagram of a state machine used by the multiprocesor arbitration logic of FIG. 2 according to the present invention.

Referring now to FIG. 6, the multiprocessor arbitration logic 134 uses a state machine M to coordinate host bus 54 arbitration between CPU1, CPU2, and the system arbiter 75. The system arbiter 75 requests control of the bus for one of the other devices under its control which, as shown in FIG. 3, includes the DMA system 71, a bus master 154, or the refresh controller 156. These other devices will generally be grouped together under the single heading of system arbiter throughout the remainder of this discussion for the purpose of clarity. The state machine M is clocked on the rising edge of a signal referred to as ZCLK1. The ZCLK1 signal has a frequency of the CLK1 signal used by the processors 20 and 21.

A review of some as yet undescribed signals from the arbitration logic 134 that are used in the following state equations is deemed appropriate. A signal referred to as the ETO signal indicates, when it is asserted, that the EISA arbitration inhibit (EAI) timeout has expired and the respective CPU is no longer protected from interruption by a bus request. A signal referred to as SLOWH* places CPU1 on hold to slow down the processor for the purpose of speed control. When the SLOWH* signal is asserted, CPU1 is prevented from gaining access to the bus. A signal referred to as RST indicates when it is asserted that a system reset is occurring. A signal referred to as TIEBRK indicates when it is high that CPU1 had the bus last and indicates when it is low that either CPU2 had the host bus last, CPU1 is asserting its priority through the PINT signal, or a system reset has occurred.

The state machine M includes four states. State 00 which represents that the system arbiter 75 is in control of the host bus 54, is split up into two states in the state machine M: state 001 representing that the TIEBRK signal is high, and state 000 representing that the TIEBRK signal is low. State 11 represents that CPU1 is in control of the bus, and state 10 represents that CPU2 is in control of the bus. When the state machine M is in state 000, it remains in state 000 while the HHOLD signal remains asserted from the ISP 124. The state machine M progresses from state 000 to state 11 when the equation:

HHOLD*×(SLOWH*×BREQ1+BREQ2*)

is true. Therefore when the TIEBRK signal is low, CPU1 gains control of the bus when the system arbiter 75 is not requesting the bus and either CPU2 is not requesting the bus or CPU1 is requesting the bus and a slowdown is not occurring. The state machine M progresses from state 000 to state 10 when the equation:

HHOLD*×BREQ2×(BREQ1*+SLOWH)

is true. Therefore, when the TIEBRK signal is low CPU2 gains control of the bus when the system arbiter 75 is not requesting the bus, CPU2 is requesting the bus and either CPU1 is not requesting the bus or a slowdown is occurring.

The state machine M progresses from state 001, indicating that CPU1 last had the bus, to state 11 when the equation

HHOLD*×BREQ2* is true. Therefore, when the TIEBRK signal is high, CPU1 gains control of the bus when the system arbiter 75 and CPU2 are not requesting the bus.

The state machine M progresses from state 001 to state 10 when the equation:

HHOLD*×BREQ2 is true. Therefore, when the TIEBRK signal is high, then CPU2 gains control of the bus when the system arbiter 75 is not requesting the bus and CPU2 is requesting the bus.

The state machine M transfers from state 001 to state 000 when the equation:

HHOLD×P1INT is true. Therefore, when an interrupt is pending while the system arbiter 75 is in control of the bus, the TIEBRK signal is set low to indicate that CPU1 now has priority over CPU2 for access to the bus. The state machine M remains in state 001 when the equation:

HHOLD×P1INT* is true.

When the state machine M is in state 11, CPU1 is in control of the host bus 54 and thus also the EISA bus 126. The state machine M progresses from state 11 to state 001 when the equation:

HHOLD×(SLOWH+BREQ1*+(ETO×HLDA1*))

is true. Therefore, control of the bus returns from CPU1 to the system arbiter 75 when the system arbiter 75 requests the bus and either a slowdown is requested, CPU1 is no longer requesting the bus or the EAI counter timeout has expired on CPU1 and CPU1 is active. The state machine M remains in state 11 when the equation:

(SLOWH*×BREQ1×(ETO×HLDA1*)*)+(-BREQ2*×HHOLD*)

is true. Therefore, CPU1 retains control of the bus in one case while it is still requesting the bus, a slowdown is not occurring and the EAI timeout for CPU1 has not expired. CPU1 also retains control of the bus if both CPU2 and the system arbiter 75 are not requesting the bus.

The state machine M progresses from state 11 to state 10 when the equation:

BREQ2×HHOLD*×(BREQ1*+SLOWH+ETO×HLDA1*)

is true. Therefore, control of the bus transfers from CPU1 to CPU2 when CPU2 is requesting the bus, the system arbiter 75 is not requesting the bus and either CPU1 is not requesting the bus, a slowdown is occurring or the timeout on CPU1 has expired.

When the state machine M is in state 10, CPU2 is in control of the bus. The state machine M progresses from state 10 to state 000 when the equation:

HHOLD×(BREQ2*+(ETO×HLDA2*))×(-P1INT×BREQ1×SLOWH*×HLDA2*)* is true. Therefore, control of the bus transfers from CPU2 to the system arbiter 75 when the system arbiter 75 is requesting the bus and either CPU2 is not requesting the bus or the timeout on CPU2 has expired, coupled with the further requirement that CPU1 is not asserting its priority while a slowdown is not occurring.

The state machine M progresses from state 10 to state 11 when the equation:

ti    (BREQ1×SLOWH*×HHOLD*×(BREQ2*-+(ETO×HLDA2*)))    +(P1INT×BREQ1×-SLOWH*×HLDA2*)

is true. Therefore, control of the bus passes from CPU2 to CPU1 in one case when CPU1 is requesting the bus, a slowdown is not occurring, the system arbiter 75 is not requesting the bus and either CPU2 is not requesting the bus or the timeout has expired on CPU2. Control of the bus also passes from CPU2 to CPU1 if CPU1 is asserting its priority by requesting the bus and asserting the P1INT signal while a slowdown is not occurring.

The state machine M remains in state 10 when the equation:

(BREQ2×(ETO×HLDA2)*+((BREQ1*+-SLOWH)×HHOLD*))
×(P1INT×BREQ1×HLDA2*×SLOWH*)

is true. CPU2's retention of the bus is conditional on CPU1 not asserting its priority over control of the bus. As additional terms, CPU2 retains control of the bus in one case when it is requesting the bus and the EAI timeout has not expired or either CPU1 is not requesting the bus or a slowdown is occurring and the system arbiter 75 is not requesting the bus.

Figure 7:
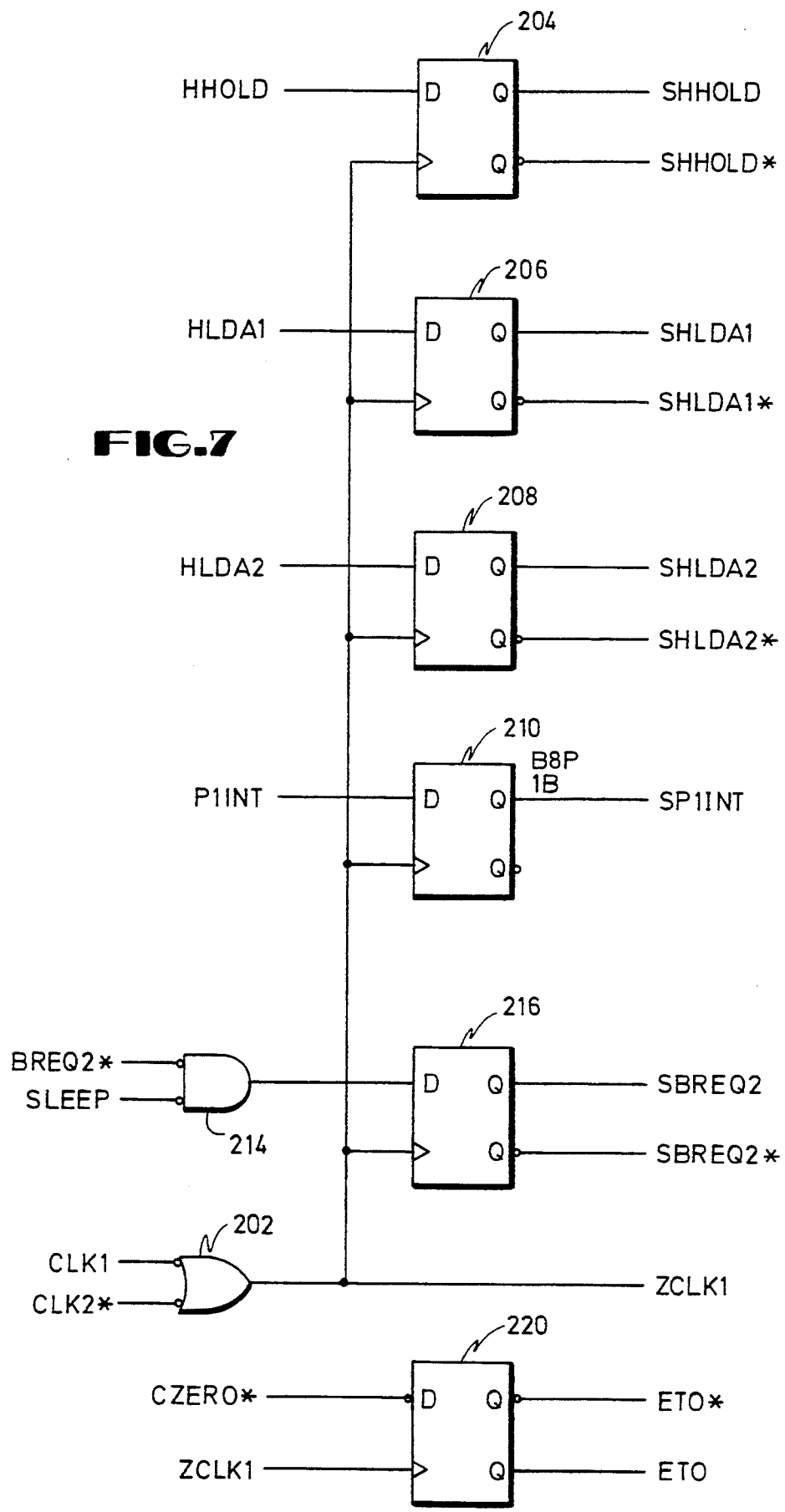
FIGS. 7, 8 and 9 are schematic diagrams of the multiprocessor arbitration circuitry in PCL1 and PCL2 of FIG. 5 according to the present invention.
Figure 8:
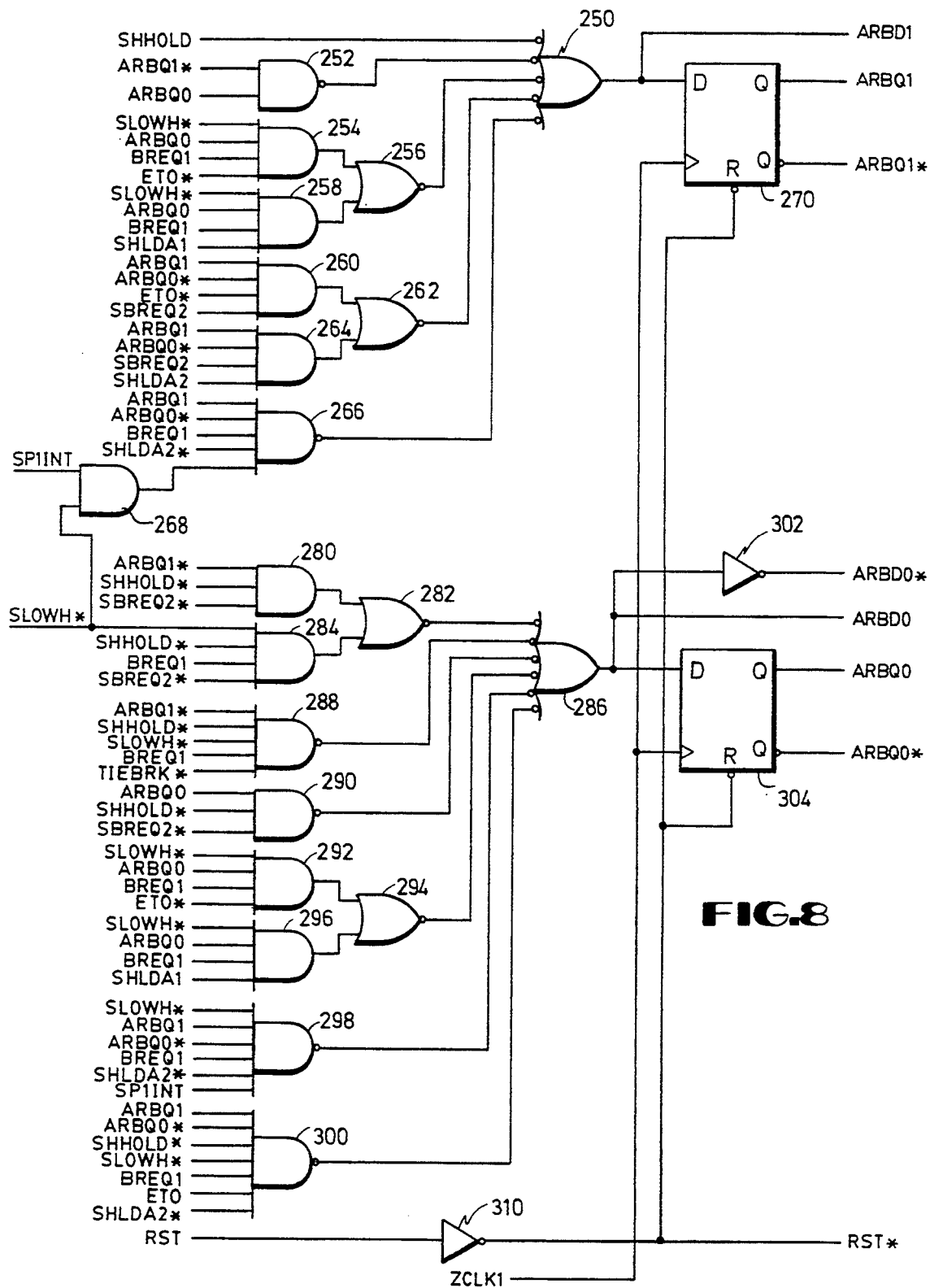
Figure 9:
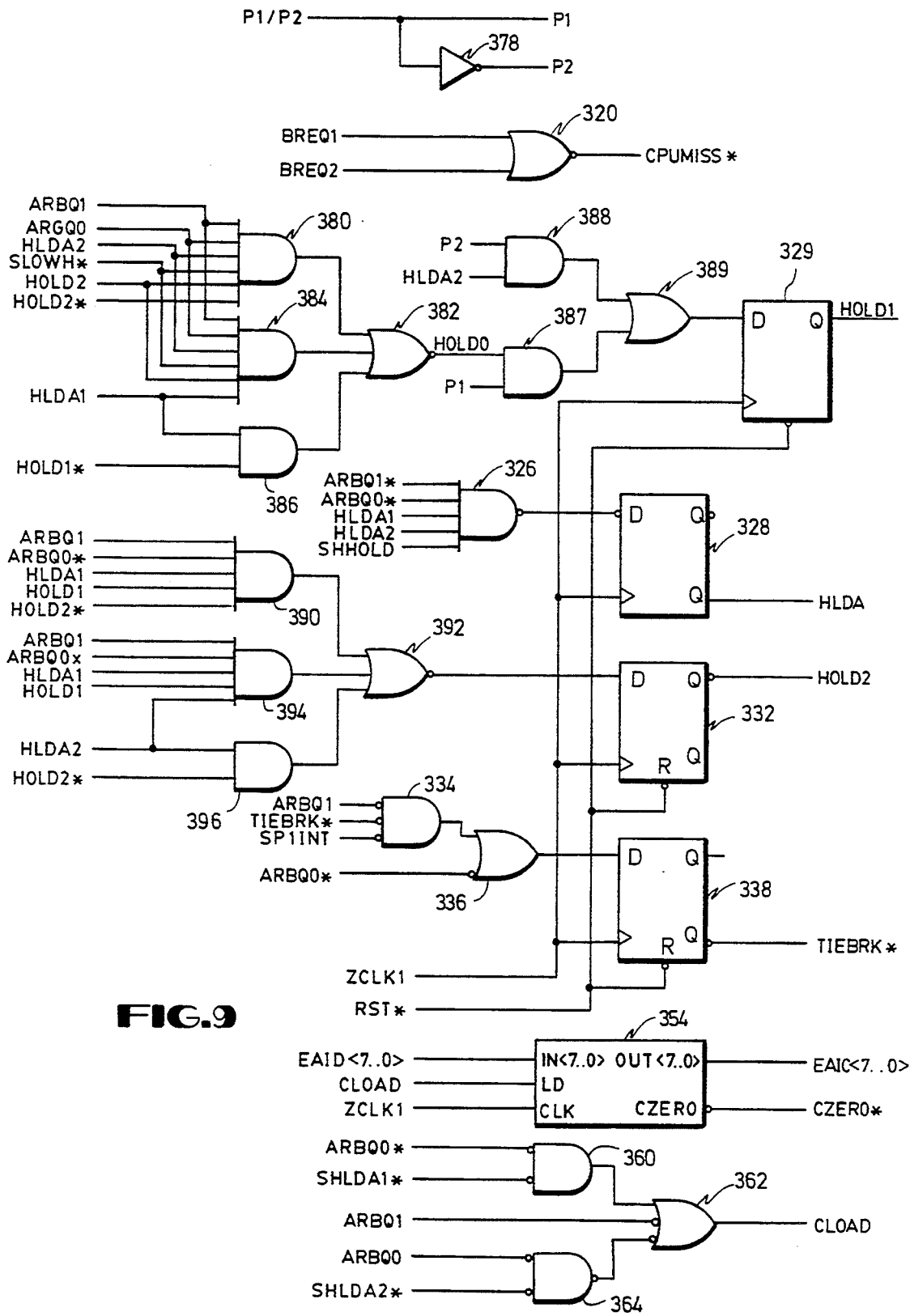

Referring now to FIGS. 7, 8 and 9, the arbitration logic present within each of PCL1 and PCL2 is shown. The arbitration logic in PCL1 and PCL2 is identical, the only difference between them being certain signal inputs to the logic. However, the arbitration logic in PCL2 is generally disabled and remains idle. As shown in FIG. 5, the particular signals input to the respective arbitration logic 134 in PCL1 and PCL2 determines the mode of operation of the respective PCL.

Referring now to FIG. 7, the arbitration logic 134 in PCL1 and PCL2 uses several D-type flip-flops to buffer the input signals that it receives. The HHOLD signal is connected to the D input of a D-type flip-flop 204 whose Q output is the SHHOLD signal, and whose inverted Q output is the SHHOLD* signal. The HLDA1 signal is connected to the D input of a D-type flip-flop 206 whose Q output is the SHLDA1 signal and whose inverted Q output is the SHLDA1* signal. The HLDA2 signal is connected to the D input of a D-type flip-flop 208 whose Q output is the SHLDA2 signal. The P1INT signal is connected to the D input of a D-type flip-flop 210 whose Q output is the SP1INT signal. The BREQ2* signal and a signal referred to as SLEEP are inputs into a two-input NOR gate 214 whose output is connected to the D input of a D-type flip-flop 216 whose output is the SBREQ2 signal. The SLEEP signal indicates, when it is asserted, that CPU2 is unable to access the bus. The SLEEP signal is used to disable operation of CPU2 when desired and is the output of an addressable register (not shown). The SBREQ2* signal is equivalent to the BREQ2* signal when the SLEEP signal is negated.

Signals referred to as CLK1 and CLK2* are inputs to a two-input NAND gate 202 whose output is the ZCLK1 signal. The CLK2 signal is the clocking signal supplied to the processor 20, if the processor 20 is an 80386, and the CLK1 signal is a clocking signal that runs at one-half the frequency of the CLK2 signal. The CLK1 signal is preferably 33 MHz. The ZCLK1 signal thus has a nominal duty cycle of 75% with a frequency of the CLK1 signal and a rising edge that occurs on every other rising edge of the CLK2 signal. The ZCLK1 signal is connected to the clock inputs of each of the D-type flip flops 204, 206, 208, 210 and 216.

The BREQ1* signal is generated from logic [not shown] inside each PCL that counts the number of CLK1 signal wait states for a memory access and determines if this number is greater than 0 to see if a cache miss has occurred. If a cache miss is determined to have occurred, then the respective BREQ1* signal is asserted.

A signal referred to as CZERO*, which when asserted low indicates that the EAI timeout has expired, is connected to the inverted D input of a D-type flip-flop 220 whose inverted Q output is the ETO* signal and whose Q output is the ETO signal. The ZCLK1 signal is connected to the clock input of the D-type flip-flop 220. In this way, the timeout of the counter, represented by the ETO* signal, is synchronized with the ZCLK1 signal. The CZERO* signal is generated from the EAI counter as shown in FIG. 9.

Referring now to FIG. 8, the arbitration logic 134 uses the signals of FIG. 7 as well as signals referred to as ARBQ0 and ARBQ1 which represent the two most significant bits of the current state of the state machine M, to generate the next state of the state machine M of FIG. 6. In the state generation logic circuitry that follows, state 00 represents that the system arbiter 75 has allocated control of the bus to a device other than the CPU register slot 152, this state being further qualified in the state machine M of FIG. 6 by the TIEBRK signal to produce states 000 and 001. The SHHOLD signal is connected to the input of a five-input NAND gate 250. The ARBQ1* signal and the ARBQ0 signal are inputs to a two-input NAND gate 252 whose output is connected to an input of the five input NAND gate 250. The SLOWH* signal, the ARBQ0 signal, the BREQ1 signal, and the ETO* signal are inputs to a four-input AND gate 254 whose output is connected to the input of a two-input NOR gate 256. The SLOWH* signal, the ARBQ0 signal, the BREQ1 signal, and the SHLDA1 signal are inputs to a four-input AND gate 258 whose output is the other input of the two-input NOR gate 256. The output of the NOR gate 256 is connected to an input of the five-input NAND gate 250. The ARBQ1 signal, the ARBQ0* signal, the ETO* signal, and the SBREQ2 signal are inputs to a four-input AND gate 260 whose output is connected to the input of a two-input NOR gate 262. The ARBQ1 signal, the ARBQ0* signal, the SBREQ2 signal, and the SHLDA2 signal are inputs to a four-input AND gate 264 whose output is connected to the other input of the two-input NOR gate 262. The output of the NOR gate 262 is connected to an input of the five-input NAND gate 250. The SPLINT signal and the SLOWH* signal are inputs to a two-input AND gate 268, whose output is connected to the input of a five-input NAND gate 266. The ARBQ1 signal, the ARBQ0* signal, the BREQ1 signal, and the SHLDA2* signal are connected to the other inputs of the five-input NAND gate 266 and its output is connected to an input of the five-input NAND gate 250. The output of the five-input NAND gate 250 is the ARBD1 signal, which represents the most significant bit of the next state in the state machine M of FIG. 6. The ARBD1 signal is connected to the D input of a D-type flip-flop 270 whose Q output is the ARBQ1 signal, whose inverted Q output is the ARBQ1* signal and whose clock input is connected to the ZCLK1 signal. The RST* signal produced by an inverter 310 whose input is the RST signal is connected to the inverted reset or clear input of the flip-flop 270.

The ARBQ1* signal, the SHHOLD* signal, and the SBREQ2* signal are inputs to a three-input AND gate 280, whose output is connected to the input of a two-input NOR gate 282. The SLOWH* signal, the SHHOLD* signal, the BREQ11 signal, and the SBREQ2* signal are inputs to a four-input AND gate 284 whose output is the other input of the two-input NOR gate 282. The output of the two-input NOR gate 282 is connected to the input of a six-input NAND gate 286. The ARBQ1* signal, the SHHOLD* signal, the SLOWH* signal, the BREQ1 signal, and the TIEBRK* signal are inputs to a five-input NAND gate 288, whose output is connected to an input of the six-input NAND gate 286. The ARBQO signal, the SHHOLD* signal, and the SBREQ2* signal are inputs to a three-input NAND gate 290 whose output is connected to an input of the six-input NAND gate 286. The SLOWH* signal, the ARBQ0 signal, the BREQ1 signal, and the ETO* signal are inputs to a four-input AND gate 292 whose output is connected to the input of a two-input NOR gate 294. The SLOWH* signal, the ARBQ0 signal, the BREQ1 signal and the SHLDA1 signal are inputs to a four-input AND gate 296 whose output is connected to an input of the two-input NOR gate 294. The output of the two-input NOR gate 294 is connected to an input of the six-input NAND gate 286. The SLOWH* signal, the ARBQ1 signal, the ARBQ0* signal, the BREQ1 signal, the SHLDA2* signal, and the SPLINT signal are inputs to a six-input NAND gate 298 whose output is connected to an input of the six-input NAND gate 286. The ARBQ1 signal, the ARBQ0* signal, the SHHOLD* signal, the SLOWH* signal, the BREQ1 signal, the ETO signal and the SHLDA2* signal are inputs to a seven-input NAND gate 300 whose output is connected to an input of the six-input NAND gate 286. The output of the six-input NAND gate 286 is the ARBD0 signal, which represents the second most significant bit in the next state of the state machine M of FIG. 6. The ARBD0 signal is connected to the input of an inverter 302 whose output is the ARBD0* signal. The ARBD0 signal is also connected to the D input of a D-type flip-flop 304 whose Q output is the ARBQ0 signal and whose inverted Q output is the ARBQ0* signal. The clock input of the flip-flop 304 is connected ZCLK1 signal, while the inverted reset or clear input is connected to the RST* signal. Thus the various NAND, AND and NOR gates 250–300 implement the next state generation logic of the state machine M, which is used for multiprocessor arbitration in PCL1.

Referring now to FIG. 9, a signal referred to as P1/P2, which when asserted high indicates that the PCL is in P1 mode (PCL1) and when asserted low indicates that the PCL is in P2 mode (PCL2), is here represented as a signal referred to as P1 and is connected to an inverter 378 to produce a signal referred to as P2.

The BREQ1 signal and the SBREQ2 signal are inputs to a two-input NOR gate 320 whose output is the CPU-MISS* signal. Therefore, the CPUMISS* signal is asserted whenever either of the cache controllers 24 and 25 of CPU1 and CPU2, respectively, have a bus request.

The ARBQ1 signal, the ARBQ0 signal, the HLDA2 signal, the SLOWH* signal, the HOLD2 signal, and the HOLD1* signal are inputs to a six-input AND gate 380, the output of which is connected to the input of a three-input NOR gate 382. The ARBQ1 signal, the ARBQ0 signal, the HLDA2 signal, the SLOWH* signal, the HOLD2 signal, and the HLDA signal are inputs to a six-input AND gate 384 whose output is connected to an input of the three-input NOR gate 382. The HLDA1 signal and the HOLD1* signal are inputs to a two-input AND gate 386 whose output is connected to an input of the three-input NOR gate 382. The output of the three-input NOR gate 382 is the HOLDD signal. The HOLDD signal is connected to the input of a two-input AND gate 387, the second input of which is the P1 signal. The HLDA2 signal is connected to the input of a two-input AND gate 388, the second input of which is the P2 signal. The outputs of the two-input AND gates 387 and 388 are connected to the inputs of a two-input OR gate 389, the output of which is connected to the D input of a D-type flip-flop 324. The output of the flip-flop 324 is the HOLD1 signal. Therefore, in PCL1 when the state machine M is in state 11, signifying that CPU1 is in or to be in control of the bus, both CPU1 and CPU2 are on hold, and a slowdown is not occurring, then the hold signal HOLD1 provided to the HOLD input of the cache controller 24 of CPU1 is deasserted, granting CPU1 control of the bus. CPU1 maintains control of the bus while the state machine M remains in state 11, but the removal of CPU2 from HOLD or the occurrence of a slowdown will force CPU1 to relinquish the bus. In PCL2, the HOLD1 signal is a delayed version of the HOLD2 signal of PCL1 which is supplied to the HLDA2 input of PCL2.

The ARBQ1* signal, the ARBQ0* signal, the HLDA1 signal, the HLDA2 signal, and the SHHOLD signal are inputs to a five-input NAND gate 326 whose output is connected to the inverted input of a D-type flip-flop 328, the output of which is the HHLDA signal. Therefore, when the state machine M is in state 00, signifying that the system arbiter 75 is in control of the bus, or is to gain control of the bus, both CPU1 and CPU2 are on hold and the system arbiter 75 is requesting the bus, then the host bus hold acknowledge signal HHLDA is asserted back to the ISP 124 and the bus controller 128, signifying that the multiprocessor arbiter 134 has relinquished control of the bus.

The ARBQ1 signal, the ARBQ0* signal, the HLDA1 signal, the HOLD1 signal, and the HOLD2* signal are inputs to a five-input AND gate 390 whose output is connected to the input of a three-input NOR gate 392. The ARBQ1 signal, the ARBQ0* signal, the HLDA1 signal, the HOLD1 signal, and the HLDA2 signal are inputs to a five-input AND gate 394 whose output is connected to an of the three-input NOR gate 392. The HLDA2 signal, and the HOLD2* signal are inputs to a two-input AND gate 396 whose output is connected to an input of the three-input NOR gate 392. The output of the three-input NOR gate 392 is connected to the D-input of a D-type flip-flop 332 whose Q output is the HOLD2 signal. Therefore, when the state machine of PCL1 is in state 10, signifying that CPU2 is to gain control the bus, and CPU1 and CPU2 are on hold, then the HOLD2 signal is deasserted low to the HLDA2 input of PCL2, which ripples through the AND gate 388 in PCL2 to lower or deassert the HOLD1 signal of PCL2, which is connected to the cache controller 25 of CPU2, granting CPU2 control of the bus. CPU2 retains control of the bus while the state machine M remains in state 10 and CPU1 remains on hold.

The ARBQ1 signal, the TIEBRK* signal, and the SPLINT signal are inputs to a three-input NOR gate 334, whose output is connected to the input of a two-input OR gate 336. The ARBQ0* signal is connected to the second inverted input of the two-input OR gate 336. The output of the OR gate 336 is connected to the D input of a D-type flip-flop 338 whose inverted Q output is the TIEBRK* signal. Therefore, the TIEBRK* signal indicates when it is high that CPU1 last had control of the bus and indicates when it is low that either CPU2 last had control of the bus, a system reset has occurred, or CPU1 has asserted its priority through the P1INT signal. The ZCLK1 signal is connected to the clock inputs of each of the D-type flip-flops 324, 328, 332 and 338. The RST* signal is connected to each of the inverted reset inputs of the D-type flip-flops 324, 332 and 338 to properly reset the flip-flops to 0 upon a system reset.

Figure 10:
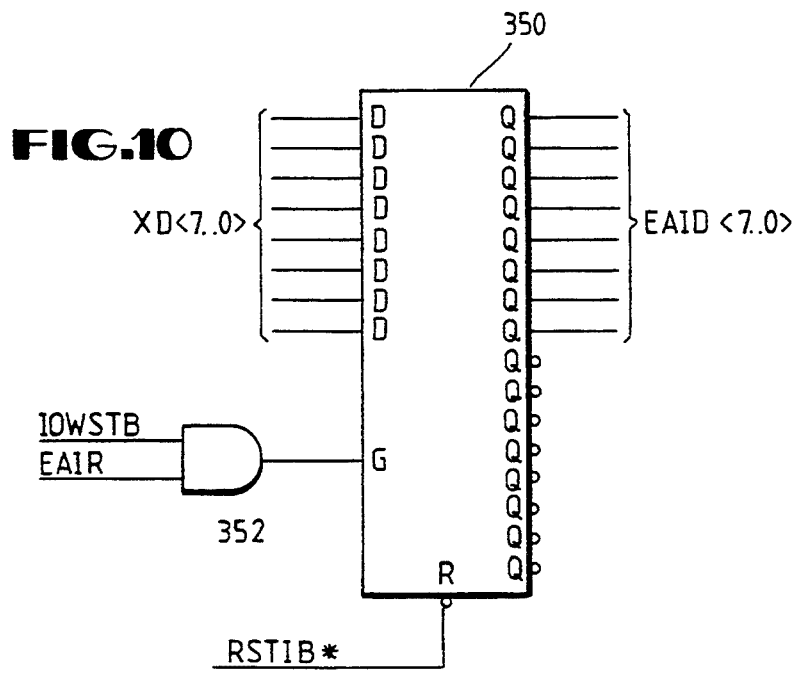
FIG. 10 is a schematic diagram of a register used for storing a value used by the EAI timer of FIG. 9 according to the present invention.

When either CPU1 or CPU2 is in control of the host bus 54, they are generally protected from interruption by the EISA arbitration inhibit EAI timer. Referring now to FIG. 10, the EAI timer uses an 8-bit latch referred to as the EAI latch to hold a preset value determining the period of the EAI timer. The EAI latch is a read/write I/O port preferably located at address 0C6BH. The data bus inputs XD<7...0> are each connected to the input of the 8 bit D-type latch 350 whose Q outputs are the EAID <7...0> signals. An I/O write strobe signal referred to as IOWSTB and a signal which represents the decoded value of the address of the EAI latch referred to as EAIR are inputs to a two-input AND gate 352 whose output is connected to the enable input of the 8 bit latch 350. Therefore, when the EAI register 350 is being written to, the IOWSTB signal and the EAIR signal are asserted, enabling the register 350 to load in the data bus values XD<7...0>. The RSTIB* signal is connected to the inverted reset input of the 8 bit latch 350 to allow a proper resetting of the register to value 0.

The EAI counter 354 (FIG. 9) is an 8-bit binary counter that counts down from a pre-determined value to zero and has an output indicating the zero condition. Because this type of counter is well known to those skilled in art, the details of its configuration have been omitted for the purpose of clarity. Referring again to FIG. 9, the EAI counter 354 is generally shown. The EAID<7...0> signals from the latch 350 are connected to the parallel load inputs of the EAI counter 354. A signal referred to as CLOAD is connected to the load input LD of the EAI counter 354. The CLOAD signal is generated as follows. The ARBQO* signal and the SHLDA1* signal are inputs to a 2-input NOR gate 360 whose output is connected to the input of a 3-input OR gate 362. The ARBQ1 signal is connected to an inverted input of the three-input OR gate 362. The ARBQO signal and the SHLDA2* signal are inputs to a 2-input OR gate 364 whose output is connected to an inverted input of the 3-input OR gate 362. The output of the 3-input OR gate 362 is the CLOAD signal. Therefore, the value from the EAI latch 350 is loaded into the EAI counter 354 when either CPU1 gains control of the bus, when CPU2 gains control of the bus or while the system arbiter 75 is in control of the bus. The ZCLK1 signal is connected to the CLK input of the EAI counter 354. The value of the EAI counter 354 is reflected in the EAIC<7...0> signals which can be provided to the system by buffers (not shown). The CZERO* signal, which represents when it is asserted low that the value of the EAI counter 354 is 0, is provided by the EAI counter 354 to indicate a timeout condition.

Figure 11:
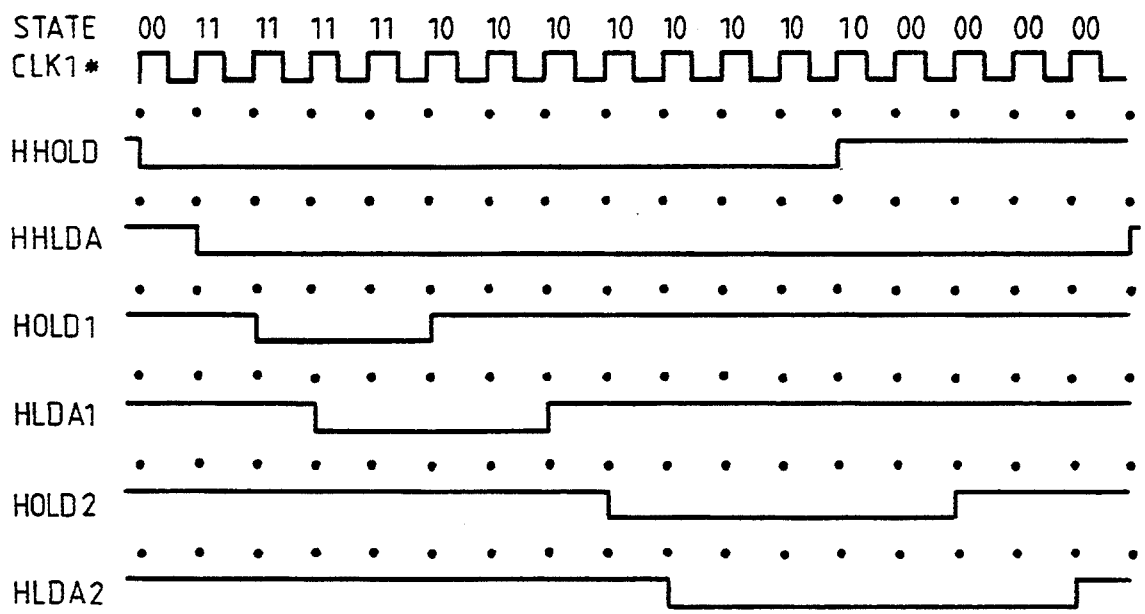
FIG. 11 is a timing diagram of a sample arbitration sequence according to the present invention.

Referring now to FIG. 11, a timing diagram representing a possible arbitration sequence conducted by the multiprocessor arbitration logic 134 in PCL1 according to the present invention is shown. Transitions among the various arbitration signals are made on the rising edge of the CLK1* signal, which corresponds to the rising edge of the ZCLK signal. The timing diagram begins with the state machine M in state 00 representing that the system arbiter 75 is in control of the bus. Firstly, the HHOLD signal is deasserted, representing that the system arbiter 75 is transferring control of the bus to the CPU requestor. The deassertion of the HHOLD signal indicates to the multiprocessor arbitration logic 134 in PCL1 that an arbitration may be conducted for the processors requesting control of the bus. On the next rising edge of the CLK1* signal, the HHLDA signal is deasserted, confirming that a processor controlled by PCL1 has assumed ownership of the bus. On the next rising edge, the HOLD1 signal is deasserted, granting CPU1 control of the bus. The state machine M is now in state 11. The HLDA1 signal of PCL1 is subsequently deasserted on the next CLK1* pulse by the cache controller 24 of CPU1.

When CPU1 relinquishes the bus, the HOLD1 signal is asserted by PCL1. CPU2 is then allocated control of the bus and the state machine M progresses to state 10. The HLDA1 signal is subsequently asserted on the second rising edge of the CLK1* signal after the HOLD1 signal is asserted by the cache controller 24, confirming that CPU1 is in hold. On the subsequent rising edge, the HOLD2 signal from PCL1 is deasserted to PCL2, which enables PCL2 to deassert its HOLD1 signal (not shown) to grant CPU2 control of the bus. This is subsequently followed by the HLDA2 signal provided by the second cache controller 25 being deasserted to PCL1.

When the HHOLD signal is asserted by the system arbiter 75, PCL1 requests that CPU2 relinquish control of the bus by asserting the HOLD2 signal to PCL2, causing PCL2 to assert its HOLD1 signal (not shown) to CPU2. This is followed by the HLDA2 signal being asserted by the cache controller 25, which enables PCL1 to assert the HHLDA signal. Thus control is transferred back to the system arbiter 75 and both CPU1 and CPU2 are on hold.

The present invention allows multiple processors to be incorporated into a computer system that utilizes a single processor arbitration scheme with minimal changes to the system. The arbitration protocol employed allows for an optimal use of the microprocessors with a minimal amount of bus contention or thrashing between them.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A computer system which allows arbitration between multiple processors, comprising:
   a system bus;
   a primary processor coupled to said system bus that can request control of said system bus by use of a bus request signal;

a secondary processor coupled to said system bus that can request control of said system bus by use of a bus request signal;

a plurality of bus masters coupled to said system bus, each bus master requesting control of said system bus by use of a bus request signal;

a higher priority system arbitration apparatus coupled to said system bus that can grant control of the system bus to a device when said device asserts a bus request signal, said higher priority system arbitration apparatus receiving said bus request signals from each of said plurality of bus masters and from only a single processor and providing only a single arbitration slot for a processor; and a lower priority multiprocessor arbitration apparatus coupled to said primary and secondary processors and to said higher priority system arbitration apparatus, said lower priority multiprocessor arbitration apparatus including:

means for receiving said bus request signals from each of said primary and said secondary processors;

means coupled to said means for receiving said primary and secondary processor bus request signals for arbitrating for control of said system bus between said primary and said secondary processors;

means coupled to said means for arbitrating for control of said system bus between said primary and said secondary processors for generating a processor bus request signal that is provided to said higher priority system arbitration apparatus; and means coupled to said means for arbitrating for control of said system bus between said primary and said secondary processors and said higher priority system arbitration apparatus for granting control of said system bus to either said primary or said secondary processors based on the result of said means for arbitrating for control of said system bus between said primary and said secondary processors when said higher priority system arbitration apparatus responds to said processor bus request signal.

2. The computer system of claim 1, further comprising:

means for asserting a priority requesting signal which requests that the primary processor gain priority control of said system bus, wherein said means for arbitrating for control of said system bus between said primary and said secondary processors includes means receiving said priority requesting signal for allowing said primary processor to gain priority for control of said system bus when said priority requesting signal is asserted.

3. The computer system of claim 2, wherein said means for asserting a priority requesting signal includes a means for indicating a pending interrupt by producing a signal, wherein said interrupt pending signal is said primary processor priority requesting signal.

4. The computer system of claim 2, wherein said means for arbitrating for control of said system bus between said primary and said secondary processors further includes means receiving a priority overriding signal from the computer system for overriding said priority for control of said system bus by said primary processor when said priority overriding signal is asserted.

5. The computer system of claim 4, wherein said means for overriding said priority for control of said system bus by said primary processor includes means for requesting a slowdown of said primary processor by producing a slowdown request signal to said means for arbitrating for control of said system bus between said primary and said secondary processors and wherein said slowdown request signal is said priority overriding signal.

6. The computer system of claim 2, wherein said means for arbitrating for control of said system bus between said primary and said secondary processors further includes:

means for granting control of said system bus to said primary processor when only said primary processor is requesting said system bus;

means for granting control of said system bus to said secondary processor when only said secondary processor is requesting said system bus;

means for granting control of said system bus to said primary processor when both said primary processor and said secondary processor are requesting control of said system bus and said priority requesting signal has been asserted; and means for granting control of said system bus to the processor least recently on said system bus when both said primary and said secondary processors are requesting control of said system bus and said priority requesting signal has not been asserted.

7. The computer system of claim 1, wherein said higher priority system arbitration apparatus can indicate a desire to transfer control of said system bus from a controlling processor to another requesting device and wherein the computer system further includes:

means coupled to said higher priority system arbitration apparatus, said primary processor and said secondary processor for removing control of said system bus from said controlling processor.

8. The computer system of claim 7, wherein said means for arbitrating for control of said system bus between said primary and said secondary processors is coupled to said means for removing control of said system bus from the controlling processor and further includes means for disabling said means for removing control of said system bus from the controlling processor for a preset period of time after either said primary or said secondary processor has gained control of said system bus.

9. The computer system of claim 8, wherein said preset period of time of said means for disabling is programmable by said primary processor or said secondary processor.

10. The computer system of claim 8, further comprising:

means for asserting a priority requesting signal which requests that the primary processor gain priority for control of said system bus, wherein said means for arbitrating for control of said system bus between said primary and said secondary processors further includes means receiving said priority requesting signal for allowing said primary processor to gain priority for control of said system bus when said priority requesting signal is asserted, and wherein said means for allowing said primary processor to have priority for control of said system bus defeats operation of said means for disabling when said received priority requesting signal is asserted.

* * * * *